United States Patent
Yang et al.

(10) Patent No.: US 9,497,617 B2
(45) Date of Patent: Nov. 15, 2016

(54) METHOD AND SYSTEM FOR TRANSMITTING CONTACT INFORMATION DURING CALL

(71) Applicant: HUIZHOU TCL MOBILE COMMUNICATION CO., LTD., Huizhou (CN)

(72) Inventors: Yan Yang, Huizhou (CN); Xiangdong Tang, Huizhou (CN)

(73) Assignee: HUIZHOU TCL MOBILE COMMUNICATION CO., LTD., Hui Zhou, Guangdong (CN)

( * ) Notice: Subject to any disclaimer, the term of this patent is extended or adjusted under 35 U.S.C. 154(b) by 69 days.

(21) Appl. No.: 14/422,635

(22) PCT Filed: Apr. 24, 2014

(86) PCT No.: PCT/CN2014/076150
§ 371 (c)(1),
(2) Date: Feb. 19, 2015

(87) PCT Pub. No.: WO2015/043173
PCT Pub. Date: Apr. 2, 2015

(65) Prior Publication Data
US 2016/0044491 A1   Feb. 11, 2016

(30) Foreign Application Priority Data

Sep. 29, 2013 (CN) .......................... 2013 1 0453293

(51) Int. Cl.
*H04M 3/42* (2006.01)
*H04W 8/18* (2009.01)
(Continued)

(52) U.S. Cl.
CPC .............. *H04W 8/183* (2013.01); *G10L 15/02* (2013.01); *G10L 15/22* (2013.01); *G10L 17/22* (2013.01);
(Continued)

(58) Field of Classification Search
CPC ....... H04W 8/183; H04W 4/12; H04W 4/14; G01L 15/02; G01L 15/22; G01L 17/22; G01L 2015/223; H04M 1/274516; H04M 3/42059; H04M 2250/74
USPC .......................................................... 455/415
See application file for complete search history.

(56) References Cited

U.S. PATENT DOCUMENTS 8,554,175 B2 * 10/2013 Pecen ................. H04L 63/0823
                                                        455/410
8,554,179 B2 * 10/2013 Pecen ................... H04L 63/101
                                                        455/411

(Continued)

FOREIGN PATENT DOCUMENTS

CN   101127796 A   2/2008
CN   101426053 A   5/2009

(Continued)

*Primary Examiner* — Marceau Milord
(74) *Attorney, Agent, or Firm* — Shimokaji IP

(57) ABSTRACT

A method for transmitting contact information during a call may include, in a call of a mobile terminal, extracting voice data of a subscriber. The method may also include determining if voice data is representative of a voice control command. If the voice data is representative of a voice control command, converting the voice control command to a corresponding Unicode code. The method may further include searching for contact information that the subscriber needs to transmit according to the Unicode code, and transmitting the found contact information to another party. The method may not affect the call of the subscriber during the information transmission process. The method may not require manual operations by the subscriber. As a result, associated operations may be very convenient.

14 Claims, 4 Drawing Sheets

(51) Int. Cl.
*H04M 1/2745* (2006.01)
*G10L 15/02* (2006.01)
*G10L 17/22* (2013.01)
*H04W 4/12* (2009.01)
*G10L 15/22* (2006.01)
*H04W 4/14* (2009.01)

(52) U.S. Cl.
CPC ... *H04M 1/274516* (2013.01); *H04M 3/42059* (2013.01); *H04W 4/12* (2013.01); *G10L 2015/223* (2013.01); *H04M 2250/74* (2013.01); *H04W 4/14* (2013.01)

(56) References Cited

U.S. PATENT DOCUMENTS

| | | | |
|---|---|---|---|
| 8,948,819 B2* | 2/2015 | Yun | G06F 3/04883 345/173 |
| 9,363,106 B2* | 6/2016 | Lee | H04L 12/588 |
| 2008/0189293 A1* | 8/2008 | Strandel | G06Q 10/107 |
| 2010/0100371 A1* | 4/2010 | Yuezhong | G06F 17/2881 704/9 |
| 2010/0191728 A1* | 7/2010 | Reilly | G06F 17/30265 707/736 |
| 2013/0093787 A1* | 4/2013 | Fulks | G06T 11/60 345/629 |
| 2014/0025598 A1* | 1/2014 | Weingarten | G06Q 10/00 705/321 |
| 2014/0115170 A1* | 4/2014 | Yang | H04W 4/00 709/227 |
| 2014/0136977 A1* | 5/2014 | Arun | G06F 17/30017 715/716 |
| 2014/0215401 A1* | 7/2014 | Kim | G06F 3/0482 715/835 |
| 2015/0066473 A1* | 3/2015 | Jeong | G06F 9/4448 704/2 |

FOREIGN PATENT DOCUMENTS

| | | |
|---|---|---|
| CN | 101931701 A | 12/2010 |
| CN | 102111483 A | 6/2011 |
| CN | 102984666 A | 3/2013 |
| CN | 103000175 A | 3/2013 |
| CN | 103281425 A | 9/2013 |
| CN | 103491257 A | 1/2014 |

* cited by examiner

METHOD AND SYSTEM FOR TRANSMITTING CONTACT INFORMATION DURING CALL

TECHNICAL FIELD

The present disclosure generally relates to the field of mobile communication devices. In particular, the present disclosure relates to a method and system for transmitting contact information during a telephone call.

BACKGROUND

Along with improvement of people's living standards and rapid development of science and technology, a variety of communication terminals, such as cell phones, are used in daily life and work. When people are using cell phones, the following situation is commonly encountered: during a call, other people's contact information needs to be transmitted to the other party of the communication, but the cell phone is in the middle of the call. Currently, the following three ways are commonly used to handle this situation.

The first way to convey contact information includes remaining in a calling state, suspending communication with the other party, entering a phone directory to look for a corresponding contact, and telling the other party the contact information while looking for a phone number. To confirm that the other party has correctly received the phone number, devices such as hands-free or headsets have to be used. Clearly, this way has complicated steps and is very inconvenient to use.

The second way to convey contact information includes remaining in a calling state, suspending communication with the other party, entering a phone directory to look for a corresponding contact, and transmitting the contact information, in the form of a text message, to the other party. Just like the first way to send contact information, the second way causes inconvenience to operations of the subscriber and requires suspension of the call.

The third way of conveying contact information includes transmitting the contact information, in a form of a text message to the other party, when the call is ended. Clearly, this way cannot be done in real time and people tend to forget.

As described above, all of the above three ways of conveying contact information have drawbacks.

Therefore, the prior art needs to be improved and developed.

SUMMARY

In light of the above drawbacks, the objects of the present invention are to provide a method and system for transmitting contact information during a call.

The present invention employs the following technical solutions:

A method for transmitting contact information during a call includes performing feature extraction on voice data, and matching extracted features with voice control commands stored in a model library; calling a contact list application programming interface to enter a contact list of a mobile terminal; searching for contact information, that a subscriber needs to transmit in the contact list of the mobile terminal, according to Unicode code; and when contact information is found, alerting the subscriber to the found contact information.

In another embodiment, a method for transmitting contact information during a call includes during a call of a mobile terminal, extracting voice data of a subscriber, and performing recognition on the voice data; determining if the voice data is representative of a voice control command; when the voice data is determine to be representative of a voice control command, converting the voice control command to a corresponding Unicode code; and searching for the contact information, that a subscriber needs to transmit, according to the corresponding Unicode code, and transmitting the four contact information to another party.

In a further embodiment, a method for transmitting contact information during a call includes pre-receiving a voice control command, entered by a subscriber, for controlling transmission of contact information, and for storing the contact information in a model library.

In yet another embodiment, a method for transmitting contact information during a call includes performing feature extraction on voice data, and matching extracted features with voice control commands stored in a model library.

In yet a further embodiment, a method for transmitting contact information during a call includes calling a contact list application programming interface to enter a contact list of a mobile terminal; searching for contact information, that a subscriber needs to transmit in the contact list of the mobile terminal, according to Unicode code; and when contact information is found, alerting the subscriber to the found contact information.

In another embodiment, a method for transmitting contact information during a call includes selecting whether to transmit contact information to another party according to a voice control command; and when a subscriber selects to transmit the contact information to the other party, calling a text message API, and transmitting the contact information to the other party via a text message.

In a further embodiment, a method for transmitting contact information during a call includes, when contact information is determined to be incorrect, searching again for the contact information, that a subscriber needs to transmit, in a contact list of a mobile terminal according to Unicode code.

In yet another embodiment, a method for transmitting contact information during a call includes, when no contact information is found, searching again for the contact information, that a subscriber needs to transmit, in a contact list of a mobile terminal according to Unicode code.

In yet a further embodiment, a system for transmitting contact information during a call includes an extraction and recognition module for, in a call of a mobile terminal, extracting voice data of a subscriber, and performing recognition on the voice data; a determination module for determining if the voice data is representative of a voice control command; a conversion module for, when the voice data is determined to be representative of a voice control command, converting the voice control command to a corresponding Unicode code; and a transmission module for searching for the contact information, that the subscriber needs to transmit, according to the Unicode code, and transmitting the contact information to another party.

In another embodiment, a system for transmitting contact information during a call includes a predetermination module for pre-receiving a voice control command, entered by a subscriber, for controlling transmission of contact information, and for storing the contact information in a model library.

In a further embodiment, a system for transmitting contact information during a call includes a matching unit for performing feature extraction on voice data, and for matching extracted features with voice control commands stored in a model library.

In yet another embodiment, a system for transmitting contact information during a call includes a calling unit for calling a contact list API to enter a contact list of a mobile terminal; a searching unit for searching for contact information, that a subscriber needs to transmit, in the contact list of the mobile terminal according to Unicode code; and an alerting unit for, when the contact information is found, alerting the subscriber to the found contact information.

In yet a further embodiment, a system for transmitting contact information during a call includes a selection unit for selecting whether to transmit contact information to another party according to a voice control command; and a transmission unit for, when a subscriber selects to transmit the contact information to the another party, calling a text message API and transmitting the contact information to the other party via a text message.

In another embodiment, a non-transitory computer-readable storage medium, which stores processor executable commands therein that, when executed by a processor, causes the processor to: during a call of a mobile terminal, extract voice data of a subscriber, and perform recognition on the voice data; determine if the voice data is representative of a voice control command; when the voice data is determined to be representative of a voice control command, convert the voice control command to a corresponding Unicode code; and search for the contact information, that the subscriber needs to transmit, according to the Unicode code, and transmit the contact information to another party.

Voice data, entered by a subscriber, is extracted during a call, and voice data, of the subscriber, is matched with predetermined voice control commands. When a correct voice control command is matched, a contact list is searched for corresponding contact information, and the found contact information is transmitted to another party of the call. Thereby, the present invention does not affect a subscriber's call during a contact information transmission process, nor does the present invention require manual operations by the subscriber. As a result, the present invention is very easy to use, and associated operations are very convenient.

DETAILED DESCRIPTION

A method and system for transmitting contact information during a call is provided. To make the objects, technical solutions, and effects, the present invention is described in detail below with reference to the accompanying drawings. It should be understood that the specific embodiments included herein are for illustrative purposes. The specific embodiments are not intended to limit the present invention.

Figure 1:
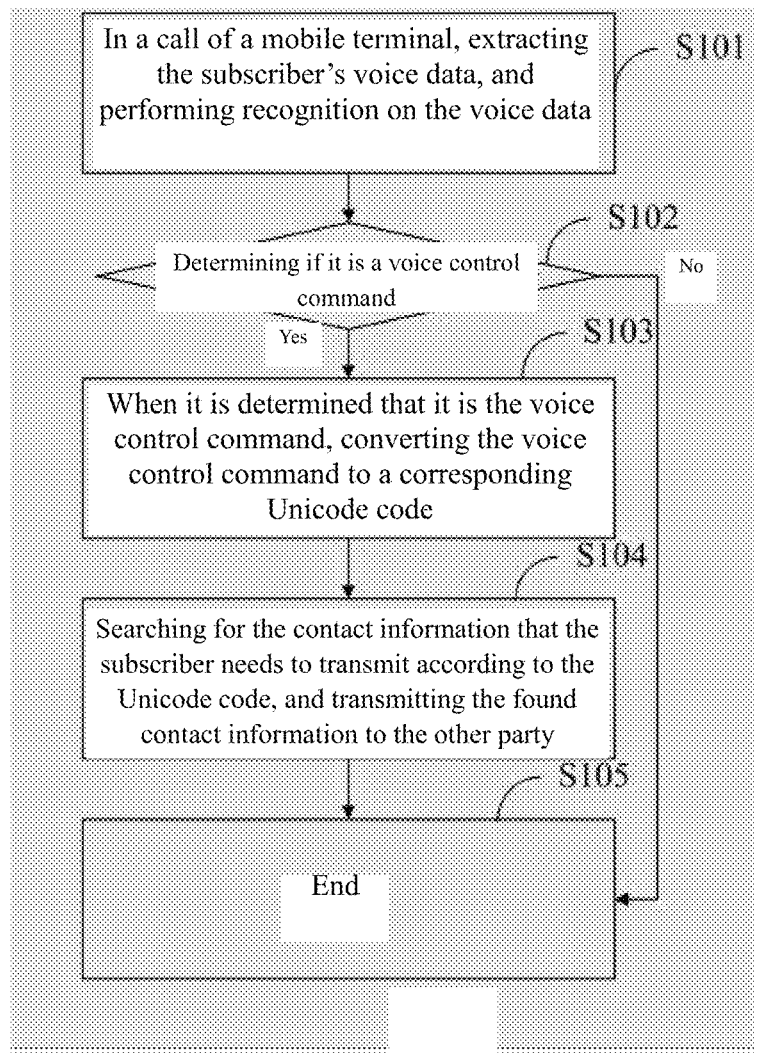
FIG. 1 depicts a flow chart of an exemplary method for transmitting contact information during a call according to the present invention.

Turning to FIG. 1, a method for transmitting contact information during a call may include, during a call of a mobile terminal, extracting voice data of a subscriber, and performing recognition on the voice data (block S101). The method may also include determining if the voice data is representative of a voice control command (block S102). When the voice data is determined to be representative of a voice control command, the voice control command is converted to a corresponding Unicode code (block S103). The method may further include searching for the contact information, that a subscriber needs to transmit, according to the Unicode code, and transmitting the contact information to another party (block S104).

Since a subscriber is always in a speaking state during call, countless voice inputs may be received, voice data may be extracted, and voice recognition may be performed on the voice data (block S101). The method may include pre-receiving a voice control command, entered by a subscriber for controlling transmission of contact information, and may also include storing the voice control command in a model library. A number of voice control commands may be stored in the model library, and when the subscriber needs to transmit contact information, a voice control command may be issued using sound.

The method for transmitting contact information during a call may include performing feature extraction on the voice data, and may also include matching the extracted features with the voice control commands stored in the model library. For feature extraction from the voice data, pre-processing, such as noise removal and cleaning, may be performed to remove noise from the voice data. Feature extraction may be performed on the pre-processed voice data, the extracted features may be compared with the voice control commands stored in the model library, and the matching results may be output.

The method for transmitting contact information during a call may include determining if voice data is representative of a voice control command according to the matching results (block S102). The method for transmitting contact information during a call may also include, when the subscriber's voice data is determined to contain a voice control command, the method may include converting the voice control command to a corresponding Unicode code. (block S103). The method for transmitting contact information during a call may include searching for a contact according to Unicode code, and transmitting the found contact information to another party (block S104).

Figure 2:
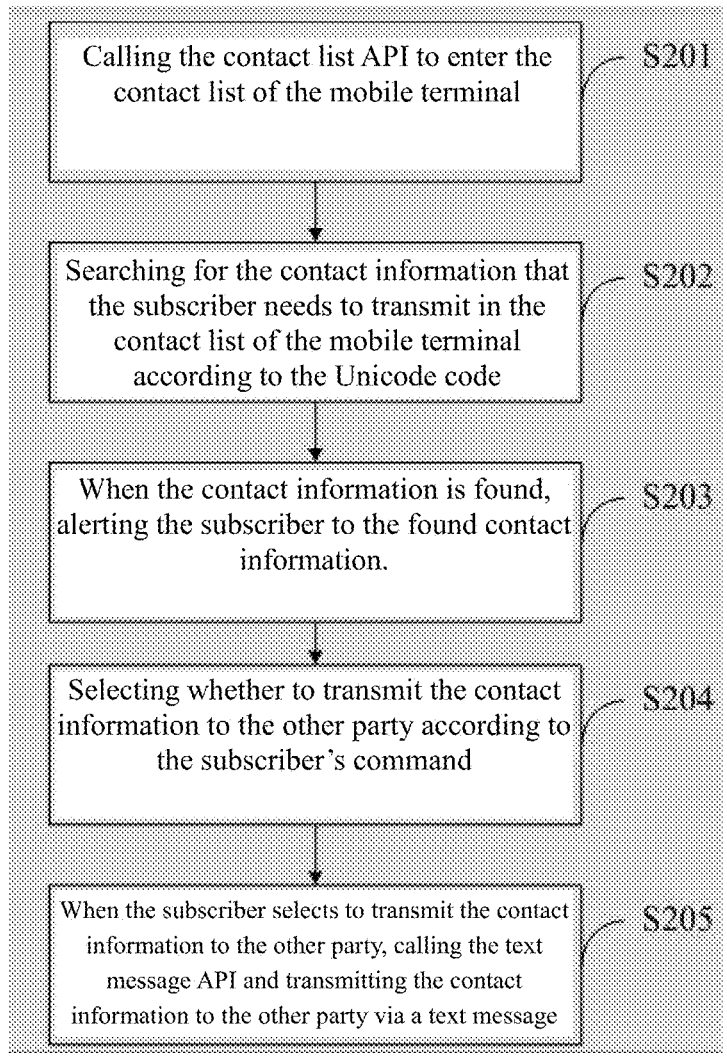
FIG. 2 depicts an exemplary flow chart of a portion of the method shown in FIG. 1.

With reference to FIG. 2, searching for contact information may include calling a contact list API (Application Programming Interface) to enter a contact list of the mobile terminal (block S201), searching for the contact information, that the subscriber needs to transmit, in the contact list of the mobile terminal according to Unicode code (block S202). Searching for contact information may include searching for the contact information through SQlite (a relational database management system in compliance with ACID), wherein ACID is an abbreviation of four basic elements for correct execution of database transactions, including: atomicity, consistency, isolation and durability. Searching for contact information may be included in backend operations, which do not affect a subscriber's calls.

When the contact information is found, the method may include alerting the subscriber to the found contact information (block S203). When the contact information is found, displaying the contact information, providing options to the subscriber, and asking the subscriber whether the subscriber wants to transmit the contact information (block S203). The method for transmitting contact information during a call may include selecting whether to transmit the contact information to the other party according to a subscriber's command (block S204). For example, the subscriber may select to transmit or not to transmit the contact information based on whether the contact information is correct. When the subscriber selects to transmit the contact information to the other party, the method may include calling a text message API and transmitting the contact information to the other party via a text message (block S205). When the contact information is confirmed to be correct, the contact information may be transmitted to the other party in the form of a text message, or may be transmitted to the other party in other current ways of information transmission. When the subscriber finds that the found contact information is not correct, or no corresponding contact is found, the subscriber may select whether to search again. If the subscriber selects to search again, the method may search again (block S202), otherwise the method may be ended.

Figure 3:
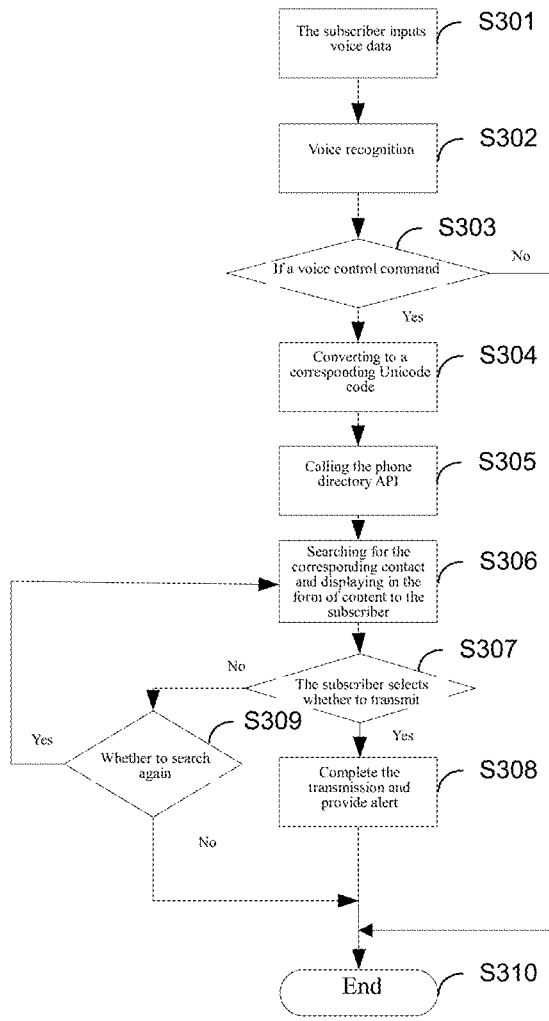
FIG. 3 depicts a flow chart of an exemplary method for transmitting contact information during a call according to the present invention.

Turning to FIG. 3, an implementation process may include a subscriber inputting voice data (block S301), performing voice recognition (block S302), and determining if the voice data, entered by the subscriber, is representative of a voice control command (block S303). If the voice data is determined to be representative of a voice control command (block S303), the implementation process may include converting the voice control command to a Unicode code (block S304), calling a phone directory API (block S305), and searching for the corresponding contact information, and displaying the contact information in the form of content to the subscriber (block S306). The subscriber may select whether to transmit the contact information (block S307). If the subscriber selects to transmit the contact information (block S307), the transmission is completed (block S308). If the subscriber selects not to transmit the contact information (block S307), the subscriber may be alerted, and may be asked whether to search again (block S309). If the voice data is determined not to be representative of a voice control command (block S303) or the subscriber selects not to search again (block S309), the implementation process may end (block S310).

Figure 4:
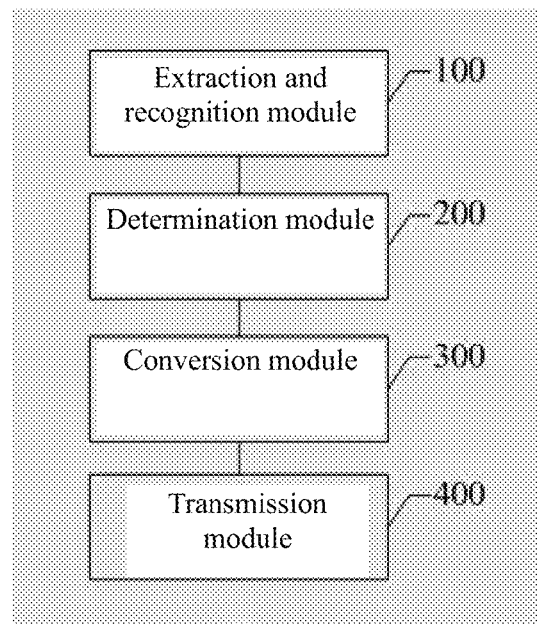
FIG. 4 depicts a structural block diagram of an exemplary system for transmitting contact information during a call according to the present invention.

With reference to FIG. 4, a system for transmitting contact information during a call may include an extraction and recognition module 100 for, in a call of a mobile terminal, extracting the voice data of a subscriber, and performing recognition on the voice data. The system for transmitting contact information during a call may also include a determination module 200 for determining if the voice data is representative of a voice control command. The system for transmitting contact information during a call may further include a conversion module 300 for, when the voice data is determined to be representative of a voice control command, converting the voice control command to a corresponding Unicode code. The system for transmitting contact information during a call may yet further include a transmission module 400 for searching for contact information, that the subscriber needs to transmit, according to Unicode code, and transmitting the found contact information to another party.

The system for transmitting contact information during a call may further include a predetermination module 500 for pre-receiving a voice control command, entered by a subscriber for controlling the transmission of contact information, and for storing the voice control command in a model library. The extraction and recognition module 100 may include a matching unit for performing feature extraction on the voice data, and for matching extracted features with the voice control commands stored in the model library.

Figure 5:
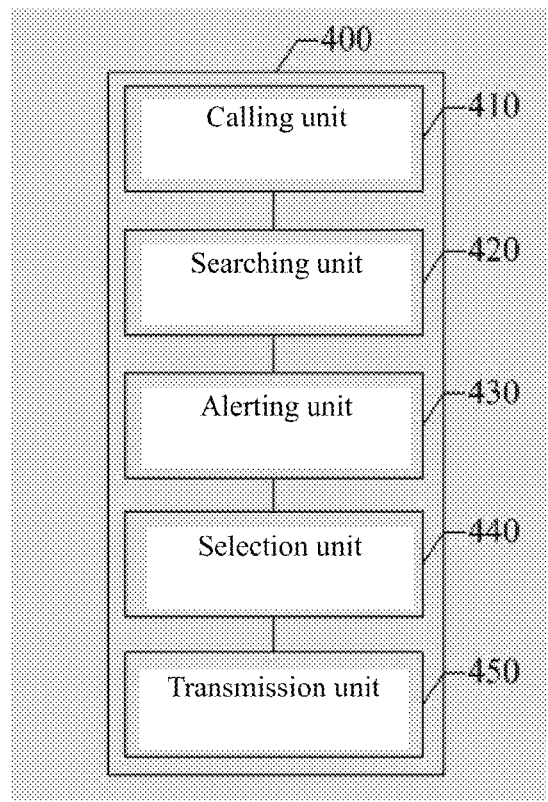
FIG. 5 depicts a structural block diagram of an exemplary transmission module included in the system shown in FIG. 4.

Turning to FIG. 5, the transmission module 400 may include a calling unit 410 for calling a contact list API to enter a contact list of a mobile terminal. The transmission module 400 may also include a searching unit 420 for searching for the contact information, that the subscriber needs to transmit, in the contact list of the mobile terminal according to Unicode code. The transmission module 400 may further include an alerting unit 430 for, when the contact information is found, alerting the subscriber to the found contact information. The transmission module 400 may yet further include a selection unit 440 for selecting whether to transmit the contact information to another party according to the subscriber's command. The transmission module 400 may also include a transmission unit 450 for, when the subscriber selects to transmit the contact information to the other party, calling a text message API and transmitting the contact information to the other party via a text message.

The system for transmitting contact information during a call may be embodied on a terminal, for example, a computer, a tablet, a cell phone, etc. The system for transmitting contact information during a call may belong to a same concept of the method for transmitting contact information during a call in the embodiment above. Any method for transmitting contact information during a call may be implemented by the system for transmitting contact information during a call.

It should be noted that, with respect to the method for transmitting contact information during a call, those skilled in the art may understand that all or a part of the method may be performed by a computer program through controlling relevant hardware (e.g., a processor executing the computer program). The computer program may be stored in a computer readable memory medium, for example, stored in a terminal's memory, and be executed by at least one processor in the terminal, and the An execution process may include, for example, implementation of the above methods, wherein the memory medium may be a non-transitory computer-readable medium, a disk, a CD, a ROM or a RAM.

With respect to the system for transmitting contact information during a call, all function modules thereof may be integrated into a single processing chip, or all function modules may have independent physical presence, or two or more modules may be integrated into a module. The integrated module may either be embodied in the form of hardware or be embodied in the form of a software function module. If the integrated module is embodied in the form of a software function module, and sold or used as an independent product, it may also be stored in a computer readable memory medium, said memory medium being, for example, a non-transitory computer readable medium, a ROM, a disk or a CD.

In summary, voice data, entered by a subscriber, may be extracted during a call, and the voice data may be compared with predetermined voice control commands. When the correct voice control command is matched with a predetermined voice control command, a contact list may be searched for corresponding contact information, and the found contact information may be transmitted to the other party of the call. The present invention may not affect the subscriber's call during a contact information transmission process. The present invention may not require manual operations by the subscriber. As a result, the present invention may be very easy to use, and the associated operations may be very convenient.

It should be understood that applications of the present invention are not limited to the above examples. To those skilled in the art, improvements or modifications may be made according to the above description, and all of these improvements or modifications shall be encompassed by the appended claims.

The invention claimed is:

1. A method for transmitting contact information during a call, the method comprising:
   during a call of a mobile terminal, extracting voice data of a subscriber, and performing recognition on the voice data;
   determining if the voice data is representative of a voice control command;
   when the voice data is determined to be representative of a voice control command, converting the voice control command to a corresponding Unicode code; and
   searching for the contact information, that a subscriber needs to transmit, according to the corresponding Unicode code, and transmitting the contact information to another party;
   performing feature extraction on the voice data, and matching extracted features with voice control commands stored in a model library;
   calling a contact list application programming interface to enter a contact list of the mobile terminal; searching for contact information, that the subscriber needs to transmit in the contact list of the mobile terminal, according to the Unicode code; and
   when contact information is found, alerting the subscriber to the found contact information;
   selecting whether to transmit the contact information to the other party according to the voice control command; and
   when the subscriber selects to transmit the contact information to the other party, calling a text message API, and transmitting the contact information to the other party via a text message.

2. The method according to claim 1, further comprising:
   pre-receiving a voice control command, entered by the subscriber, for controlling the transmission of contact information, and for storing the contact information in the model library.

3. The method according to claim 1, further comprising:
   when the contact information is determined to be incorrect, searching again for the contact information, that the subscriber needs to transmit, in the contact list of the mobile terminal according to the Unicode code.

4. The method according to claim 1, further comprising:
   when no contact information is found, searching again for the contact information, that the subscriber needs to transmit, in the contact list of the mobile terminal according to the Unicode code.

5. The method according to claim 1, further comprising:
   pre-receiving a voice control command, entered by the subscriber, for controlling the transmission of contact information, and for storing the contact information in the model library.

6. The method according to claim 5, further comprising:
   performing feature extraction on the voice data, and matching extracted features with voice control commands stored in a model library.

7. The method according to claim 1, further comprising:
   calling a contact list application programming interface to enter a contact list of the mobile terminal;
   searching for contact information, that the subscriber needs to transmit in the contact list of the mobile terminal, according to the Unicode code; and
   when contact information is found, alerting the subscriber to the found contact information.

8. The method according to claim 7, further comprising:
   selecting whether to transmit the contact information to the other party according to the voice control command; and
   when the subscriber selects to transmit the contact information to the other party, calling a text message API, and transmitting the contact information to the other party via a text message.

9. The method according to claim 7, further comprising:
   when the contact information is determined to be incorrect, searching again for the contact information, that the subscriber needs to transmit, in the contact list of the mobile terminal according to the Unicode code.

10. The method according to claim 7, further comprising:
    when no contact information is found, searching again for the contact information, that the subscriber needs to transmit, in the contact list of the mobile terminal according to the Unicode code.

11. A system for transmitting contact information during a call, the system comprising:
    an extraction and recognition module for, in a call of a mobile terminal, extracting voice data of a subscriber, and performing recognition on the voice data;
    a determination module for determining if the voice data is representative of a voice control command;
    a conversion module for, when the voice data is determined to be representative of a voice control command, converting the voice control command to a corresponding Unicode code; and
    a transmission module for searching for the contact information, that the subscriber needs to transmit, according to the Unicode code, and transmitting the contact information to another party;
    a calling unit for calling a contact list API to enter a contact list of a mobile terminal;
    a searching unit for searching for the contact information, that the subscriber needs to transmit, in the contact list of the mobile terminal according to the Unicode code; and
    an alerting unit for, when the contact information is found, alerting the subscriber to the found contact information;
    a selection unit for selecting whether to transmit the contact information to the other party according to the voice control command; and
    a transmission unit for, when the subscriber selects to transmit the contact information to the other party, calling a text message API and transmitting the contact information to the other party via a text message.

12. The system according to claim 11, further comprising:
    a predetermination module for pre-receiving a voice control command, entered by the subscriber, for controlling transmission of contact information, and for storing the contact information in a model library.

13. The system according to claim 12, further comprising:
    a matching unit for performing feature extraction on the voice data, and for matching extracted features with voice control commands stored in the model library.

14. A non-transitory computer-readable storage medium, which stores processor executable commands therein that, when executed by a processor, causes the processor to:
  during a call of a mobile terminal, extract voice data of a subscriber, and performing recognition on the voice data;
  determine if the voice data is representative of a voice control command;
  when the voice data is determined to be representative of a voice control command, convert the voice control command to a corresponding Unicode code; and
  search for the contact information, that the subscriber needs to transmit, according to the Unicode code, and transmit the contact information to another party
  call a contact list application programming interface to enter a contact list of a mobile terminal;
  search for the contact information, that the subscriber needs to transmit, in the contact list of the mobile terminal according to the Unicode code; and
  when the contact information is found, alert the subscriber to the found contact information;
  select whether to transmit the contact information to the other party according to the voice control command; and
  when the subscriber selects to transmit the contact information to the other party, call a text message API, and transmit the contact information to the other party via a text message.

* * * * *